United States Patent [19]
Miller et al.

[11] Patent Number: 5,302,465
[45] Date of Patent: Apr. 12, 1994

[54] PLASMA SPRAYED CERAMIC THERMAL BARRIER COATING FOR NiAl-BASED INTERMETALLIC ALLOYS

[75] Inventors: Robert A. Miller, Brecksville; Joseph Doychak, Westlake, both of Ohio

[73] Assignee: The United States of America as represented by the Administrator of the National Aeronautics and Space Administration, Washington, D.C.

[21] Appl. No.: 970,669

[22] Filed: Oct. 26, 1992

[51] Int. Cl.$^5$ .............................................. B22F 7/00
[52] U.S. Cl. ...................................... 428/552; 428/553; 428/565
[58] Field of Search .......................... 428/552, 553, 565

[56] References Cited

U.S. PATENT DOCUMENTS

| | | | |
|---|---|---|---|
| 4,075,364 | 2/1978 | Panzera | 427/34 |
| 4,142,022 | 2/1979 | Erickson et al. | 428/432 |
| 4,248,940 | 2/1981 | Goward et al. | 428/633 |
| 4,451,496 | 5/1984 | Gedwill et al. | 427/34 |
| 4,503,130 | 3/1985 | Bosshart et al. | 428/632 |
| 4,530,884 | 7/1985 | Erickson et al. | 428/608 |
| 4,714,624 | 12/1987 | Naik | 427/34 |
| 4,764,341 | 8/1988 | Flaitz et al. | 419/9 |
| 4,861,618 | 8/1988 | Vine et al. | 427/34 |
| 4,897,315 | 1/1990 | Gupta | 428/552 |
| 4,935,073 | 6/1990 | Bartlett et al. | 148/247 |
| 5,032,469 | 7/1991 | Merz et al. | 428/662 |
| 5,035,957 | 7/1991 | Bartlett et al. | 428/552 |

*Primary Examiner*—Peter A. Nelson
*Attorney, Agent, or Firm*—Gene E. Shook; Guy M. Miller; James A. Mackin

[57] ABSTRACT

A thermal barrier coating system consists of two layers of a zirconia-yttria ceramic. The first layer is applied by low pressure plasma spraying. The second layer is applied by conventional atmospheric pressure plasma spraying. This facilitates the attachment of a durable thermally insulating ceramic coating directly t the surface of a highly oxidation resistant NiAl-based intermetallic alloy after the alloy has been preoxidized to promote the formation of a desirable $Al_2O_3$ scale.

10 Claims, 1 Drawing Sheet

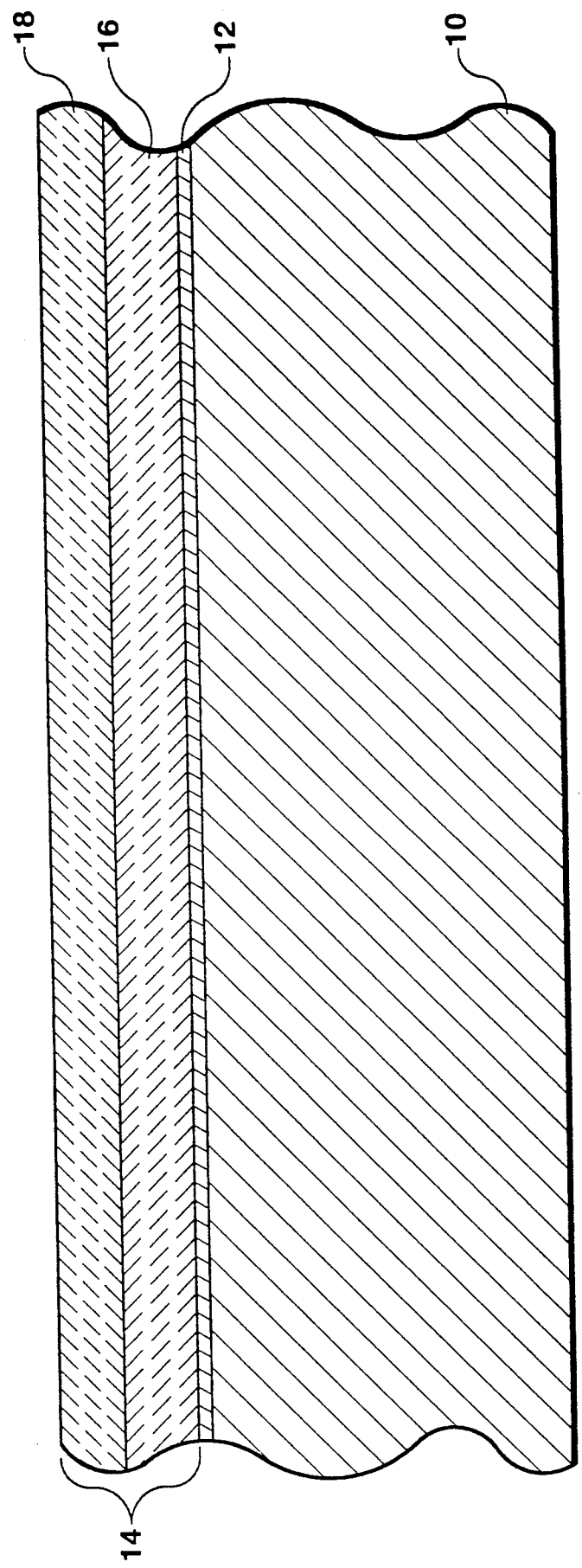

PLASMA SPRAYED CERAMIC THERMAL BARRIER COATING FOR NIAl-BASED INTERMETALLIC ALLOYS

ORIGIN OF THE INVENTION

The invention described herein was made by employees of the U.S. Government and may be manufactured and used by or for the Government for governmental purposes without the payment of any royalties thereon or therefor.

TECHNICAL FIELD

This invention is concerned with adherent and durable plasma sprayed zirconia-yttria ceramic thermal barrier coatings on NiAl-based alloys or composites of arbitrary roughness. The invention is particularly directed to plasma spraying two layers of a ceramic coating, the first being sprayed directly onto a NiAl-based intermetallic alloy.

Intermetallic alloys are alloys that are formed by combining two or more metallic elements to produce a new material having an ordered structure with thermochemical, thermophysical, and environmental properties that are significantly different from the starting elements. These intermetallic alloys are significantly different from the solid solution type of high-temperature alloys that are known as superalloys.

A prior art high temperature environmental coating for the superalloy class of material comprises a single layer of an oxidation resistant metallic coating. A two-layer coating system has been proposed in which a layer of oxidation resistant metal is covered by a layer of thermally insulating ceramic material. The purpose of the metallic layer in a thermal barrier coating system is to protect the superalloy substrate against oxidation and to provide a rough surface for the attachment of the ceramic layer.

Traditional thermal barrier coating systems for aircraft gas turbine engines typically utilize an outer layer of thermally insulating ceramic, such as zirconia—yttria. The outer layer is applied to an inner layer of an oxidation resistant metallic bond coat, such as an MCrAlY alloy, where "M" may represent Ni,Co,-Fe,NiCo, etc.

In these prior thermal barrier coating systems the outer ceramic layer is generally applied by atmospheric pressure plasma spraying. The inner metallic layer is applied to a grit blasted roughened substrate by either atmospheric pressure plasma spraying or low pressure plasma spraying. The surface of the plasma sprayed bond coat in a traditional thermal barrier coating system is rough and convoluted. Consequently, this surface is ideal for ceramic layer adherence.

The bond coat layer in a traditional thermal barrier coating system is inappropriate for NiAl-based alloys and composites because such substrates are highly oxidation resistant and thus do not require the oxidation resistance of a bond coat. Also, the additional weight of the bond coat is undesirable for any applications where weight must be minimized.

However, the atmospheric pressure plasma sprayed ceramics of the prior art require a bond coat for optimum adherence, and adherence to a smooth uncoated substrate is especially poor. While adherence may be improved by grit blast roughening, this procedure will not produce the ideal surface for ceramic layer adherence.

NiAl-based intermetallic alloys do not require a metallic coating for oxidation resistance because of the superior oxidation resistance of intermetallic alloys. These materials do require thermally insulating ceramic coatings for certain applications.

It is, therefore, an object of the present invention to provide a ceramic coating that will bond directly to an intermetallic alloy and remain attached during high temperature cyclic exposure. Another object of the invention is to extend the life of components that are exposed to elevated gas temperatures.

Still another object of the invention is to provide improved adherence of a ceramic thermal barrier coating to an NiAl-based substrate whether it is smooth or grit-blasted.

BACKGROUND ART

Goward et al U.S. Pat. No. 4,248,940 is directed to a process for the coating of nickel-based superalloys with a graded thermal barrier coating of multiple layers, each having an increased proportion of ceramic materials. The concentration of gradient facilitates smooth transition from a bond material having small quantities of ceramic material to a top layer thermal barrier coating which is predominantly of ceramic material.

Gedwill et al U.S. Pat. No. 4,451,496 is concerned with a coating system comprising a metal/ceramic cermet applied to a substrate with a metallic layer subsequently applied to the cermet layer.

Naik U.S. Pat. No. 4,714,624 describes a method of applying a metal coating system comprising two metallic layers. The outer layer is an MCrAlY coating, and the inner layer is an aluminide coating.

Vine et al U.S. Pat. No. 4,861,618 is concerned with a specific thermal barrier coating for superalloys comprising a specific NiCoCrAlY composition for the metallic layer and a specific $ZrO_2$—$Y_2O_3$.

Gupta U.S. Pat. No. 4,897,315 discloses an aluminized MCrAlY coating. Merz et al U.S. Pat. No. 5,032,469 describes a metallic coating of stainless steel plus titanium, zirconium, hafnium, niobium, tantalum, molybdenum and/or tungsten.

DISCLOSURE OF THE INVENTION

This invention is directed to the application of a ceramic coating to a nickel based intermetallic substrate. The invention does not rely on the use of an adhesive coating.

According to the invention, two coats of ceramic material are applied to the intermetallic substrate. First, the NiAl substrate is preheated in an oxidizing environment which allows the formation of a thin coat of $Al_2O_3$.

Next, a thin layer of ceramic material is applied in a low pressure plasma spraying chamber. The pressure is raised to atmospheric levels for the application of the second thicker coat. The resulting thermal barrier coating is just as effective as the previous coatings.

BRIEF DESCRIPTION OF THE DRAWINGS

The objects, advantages, and novel features of the invention will be more fully apparent from the following detailed description when read in connection with the accompanying drawing which is an enlarged vertical section view of a substrate coated in accordance with the present invention.

BEST MODE FOR CARRYING OUT THE INVENTION

The thermal barrier coating system of the present invention comprises two layers of a zirconia-yttria ceramic material. The first layer is applied by low pressure plasma spraying. The second layer is applied by conventional atmospheric pressure plasma spraying. This facilitates the attachment of a durable thermally insulating ceramic coating directly to the surface of a highly oxidation resistant NiAl-based intermetallic alloy after the alloy has been preoxidized to promote the formation of a desirable $Al_2O_3$ scale.

Referring now to FIG. 1, there is shown an NiAl-based to high temperature gases such as those found in turbine engines. An oxide scale 12 covers this surface.

A ceramic thermal barrier coating system 14 is in direct contact with the surface scale 12 to protect the substrate 10 from the high temperature gases. The thermal barrier coating system 14 includes an inner layer 16 that is plasma sprayed directly onto the surface scale 12 and an outer layer 18 that is plasma sprayed onto the layer 16.

In order to illustrate the beneficial technical effects of the invention, a substrate 10 in the form of a cast, large grain NiAl+Zr intermetallic alloy was ground to a very smooth surface finish of 0.25 $\mu$m (10 microinch). The casting had a 1.3 cm (0.5 inch) diameter and large grains between 1 cm and 3 cm. The composition of the intermetallic alloy was nominally 50 atomic percent aluminum and 0.1 atomic percent zirconium.

In order to achieve a strong ceramic-to-substrate bond, a ceramic thermal barrier coating 14 of $ZrO_2$-8w/o $Y_2O_3$ was applied directly to the substrate 10. The first layer 16 of the ceramic material was deposited onto the surface scale 12 of the preheated substrate 10 by low pressure plasma spraying at 52 Kw(1050 A) using an Ar-2.5% $H_2$ arc gas.

The second ceramic layer 18 was deposited by conventional atmospheric pressure plasma spraying at 35 Kw(900 A) using an Ar-40% He arc gas. The inner ceramic thermal barrier coating layer 16 bonded to the substrate 10 and had a surface roughness that was sufficiently rough to facilitate attachment of the outer layer 18. This procedure eliminated the need for a conventional metallic bond coat because the low pressure plasma sprayed ceramic adheres well to the surface scale 12 even when this surface is smooth.

Before the ceramic thermal barrier coating 14 was applied, the substrate 10 was preoxidized for about one hour at 1200° C. This assured that a protective $\alpha$-$Al_2O_3$ scale 12 formed on the surface.

The initial low pressure plasma sprayed ceramic layer 16 was applied to a thickness of about 0.0018 cm (0.0007 inches). The remaining ceramic layer 18 was applied by atmospheric pressure plasma spraying to a sufficient thickness so that the total ceramic thickness of the coating 14 was about 0.025 cm (0.010 inches).

The quality of the thermal barrier coating 14 in terms of durability was evaluated in a burner rig. The rig burned JP5 jet fuel and 260° C. preheated air at a combustor pressure of 0.007 MPa (1 psi). The combustion gases exited the combustor through a nozzle at Mach 0.3 and impinged upon a single rotating specimen. Each cycle consisted of six minutes in the flame and four minutes of forced air cooling. The test temperature was 1200° C. The pyrometer reading of the uncoated end of the relatively short specimen was 1070° C. which is a lower limit to the actual top surface temperature because the top surface is not a black body.

The coating survived until delamination and failure by spalling began at the top edge of the specimen at 231 cycles. The spalled region grew to the hot zone at cycle 294. This life, even though shortened by the edge effect failure, compared well to the performance of conventional rougher (about 7 um or 270 microinch) Ni-CrAlY/$ZrO_2$-$Y_2O_3$ coated specimens that had been tested at 1200° in that burner rig. These specimens, tested in four specimen carousels, lasted an average of only 186 cycles with the range being between 164 and 207 cycles.

Post test metallographic examination of the axially sectioned pre-oxidized specimen revealed that the outer layer 18 of the ceramic thermal barrier coating 14 was porous, while the inner layer 16 was denser, but microcracked throughout. Coating delamination and failure occurred within the microcrack section. Cracking was never observed at the alumina/substrate interface and only occasionally would a crack extend to the outer region of the thermally grown alumina scale 12.

DESCRIPTION OF THE ALTERNATE EMBODIMENT

It is contemplated that the substrate 10 may be grit blast roughened. A NiAl-based composite, for example, NiAl/AlN may replace the NiAl monolithic alloy.

Plasma sprayed parameters and preoxidation parameters may be modified from those previously described. It will be appreciated that the application of the ceramic thermal barrier coating to NiAl is possible without having to first apply a bond coat and without having to grit blast roughen the substrate.

It is apparent that the use of low pressure plasma spraying to apply a ceramic zirconia-yttria layer directly to a smooth highly oxidation resistant NiAl intermetallic alloy has been successful. It will be appreciated that various structural modifications may be made to the invention without departing from the spirit thereof or the scope of the subjoined claims.

What is claimed is:

1. A coated article of manufacture comprising
   an intermetallic alloy substrate having a surface exposed to high temperature gases,
   a scale covering said surface, and
   a ceramic thermal barrier coating in direct contact with said surface scale for protecting said surface from said gases.

2. An article of manufacture as claimed in claim 1 wherein the substrate is a NiAl based intermetallic alloy.

3. A coated article of manufacture comprising,
   a NiAl based intermetallic alloy substrate having a surface exposed to high temperature gases,
   an $\alpha$-$Al_2O_3$ scale covering said surface, and
   a ceramic thermal barrier coating consisting of two layers of $ZrO_2$-8w/o $Y_2O_3$ in direct contact with said surface scale for protecting said surface from said gases.

4. An article of manufacture as claimed in claim 3 wherein the substrate comprises a NiAl+Zr intermetallic alloy.

5. An article of manufacture as claimed in claim 2 wherein the substrate surface is covered with an oxide scale.

6. A coated article of manufacture comprising, a NiAl based intermetallic alloy substrate having a surface exposed to high temperature gases, an $\alpha$-$Al_2O_3$ scale covering said surface, and a two layer ceramic thermal barrier coating for protecting said surface from said gases, said coating consisting of a first layer of a lower pressure plasma sprayed zirconia-yttria in direct contact with said scale and a second layer of an atmospheric pressure plasma sprayed zirconia-yttria covering said first layer.

7. An article of manufacture as claimed in claim 5 wherein the oxide scale is $\alpha$-$Al_2O_3$.

8. An article of manufacture as claimed in claim 3 wherein the substrate comprises a NiAl+Zr intermetallic alloy.

9. An article of manufacture as claimed in claim 3 wherein the substrate comprises a NiAl-based composite.

10. An article of manufacture as claimed in claim 9 wherein the substrate comprises a NiAl/AlN composite.

* * * * *